United States Patent [19]
Brignard et al.

[11] 3,783,727
[45] Jan. 8, 1974

[54] VEGETABLE CUTTING AND SLICING MACHINE

[76] Inventors: Francois C. Brignard, 1 Bis rue du Marechal Joffre, Nice; Jean E. Lefranc, "La Montagne", Beaune, both of France

[22] Filed: Apr. 8, 1971

[21] Appl. No.: 132,408

[30] Foreign Application Priority Data
Apr. 9, 1970   France .............................. 7012908

[52] U.S. Cl. .................... 83/592, 83/356.3, 83/437
[51] Int. Cl. ............................................ B26d 5/08
[58] Field of Search ................. 146/78 R, 124, 125; 83/592, 437, 356.3

[56] References Cited
UNITED STATES PATENTS
3,473,587   10/1969   Nishimura ......................... 146/78 R
3,392,768   7/1968   Anliker ............................. 146/124 X
2,715,927   8/1955   Cupper et al. ................. 146/78 R X FOREIGN PATENTS OR APPLICATIONS
205,895   7/1966   Sweden .............................. 146/124

*Primary Examiner*—Gil Weidenfeld
*Attorney*—Otto John Munz and Dr. M. C. L. Juris

[57] ABSTRACT

A machine adapted to slice vegetables, and particularly potatoes, and especially a machine adapted for cutting slices of various desired shapes, such as flat slices, wavy slices, chequered wavy slices and substantially cubical shaped pieces.

3 Claims, 8 Drawing Figures 3,783,727

INVENTORS:
FRANCOIS C. BRIGNARD, JEAN E. LEFRANC

BY *[signature]*

ATTORNEY

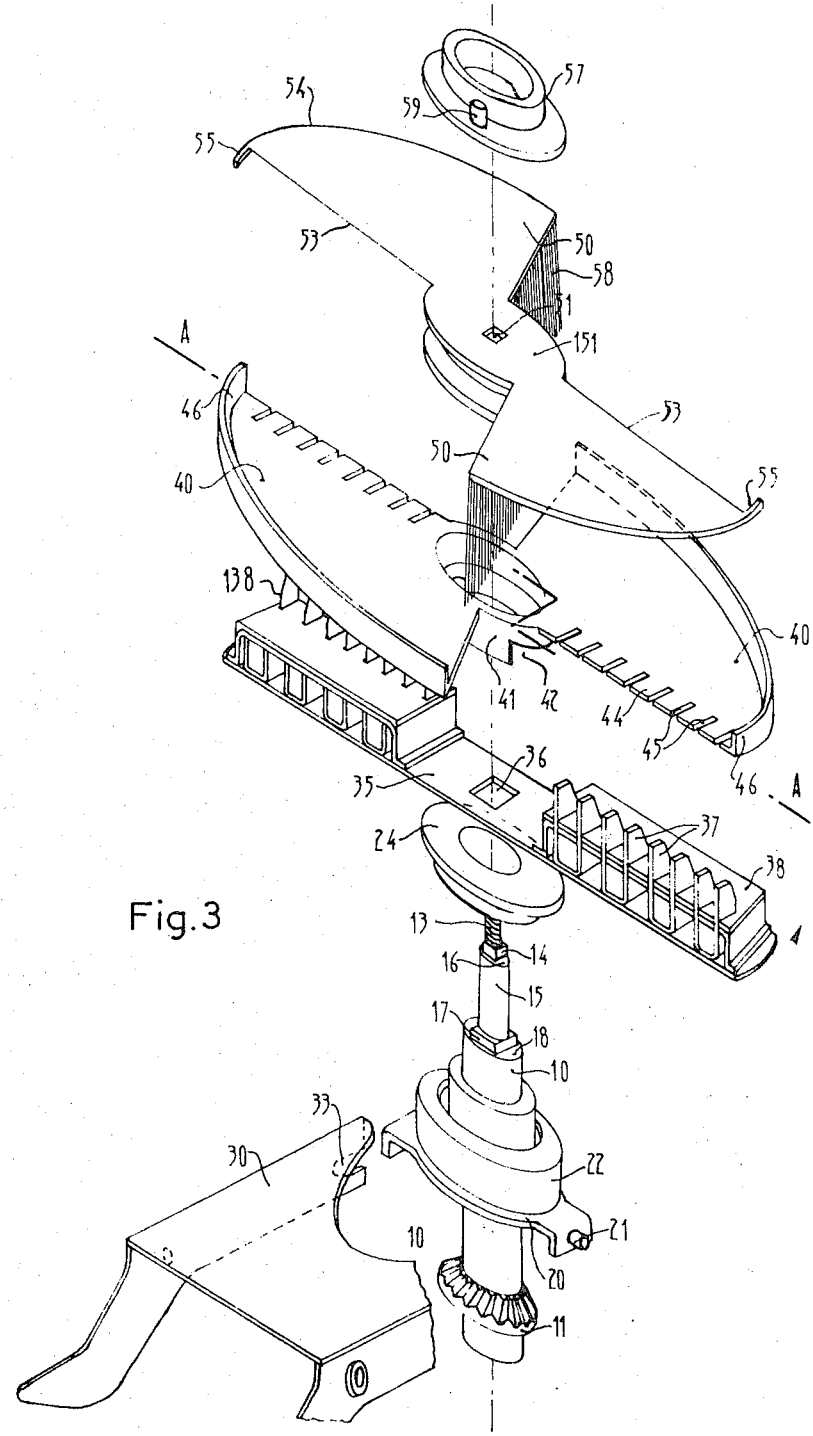

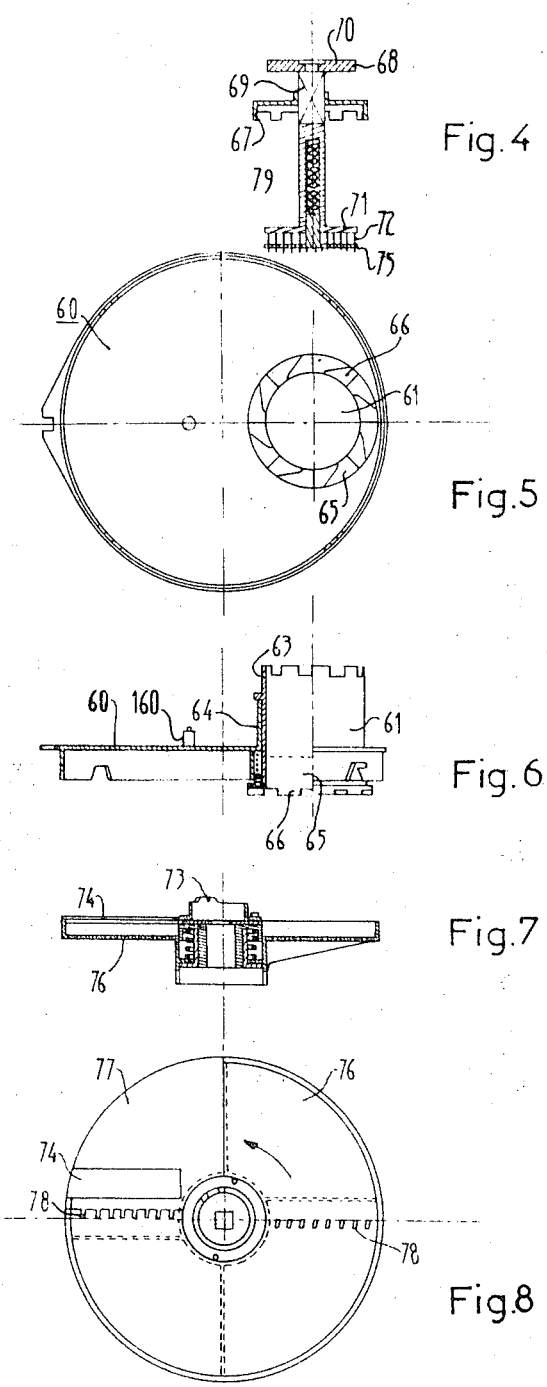

VEGETABLE CUTTING AND SLICING MACHINE

BACKGROUND OF THE INVENTION

1. FIELD OF THE INVENTION

A machine having a minimum of parts capable of performing with respect to vegetables all the cutting and slicing operations normally done in a domestic kitchen.

2. DESCRIPTION OF THE PRIOR ART

Machines of the type in which the cutting member consists of a rotary unit mounted on a rotatably mounted shaft have already been disclosed. In such machines, the vegetable to be sliced is placed in a hopper and brought into contact with the cutting member through a light pressure of the hand that is exerted on a feeding plunger. Further rotary units of the type are known, which consist of several coaxially mounted trays being placed on top of each other and wherein at least one of the trays is axially movable in relation to the others. Also rotary units adapted to shred potatoes into small sticks ("pommes frites") have been described before. Such units consist of three trays; the first of which has a plurality of cutting blades perpendicular to the plane of the tray; the second has one or several cutting blades on the same plane as the tray; the third forms a platform and is movable along the axis of rotation perpendicular to the trays (i.e. in the direction of the driving spindle of the rotary unit). Such a movably mounted platform permits an adjustment means to vary the thickness of the vegetable slices. Also the prior art discloses that the first tray may be movably mounted in relation to the second in order to retract the plurality of cutting blades, which structural arrangement enables the operator to have instead of small sticks meant to be "pommes frites" -slices for chips, slices for roasting etc. . . according to the selective thickness of the slices.

Cleverly contrived as they are, these prior machines, have never been in favor with the public, probably because their disassembling for cleaning purposes after use is not easy. Moreover the disassembling feature has not been planned in the construction of the machines. This cleaning, however, is an essential requirement in such machines, because the last slice of each vegetable is carried along on the third tray without being cut by the plurality of cutting blades, and it remains there, preventing a subsequent adjustment to vary the thickness of the slices, unless the machines are cleaned.

This problem of disassembly comes from the fact that when the three trays are placed in the order above mentioned, the movably mounted arrangement shifts in a direction parallel to the rotary axis. Since this does occur, the solution is obviously to control its shifting. However, such a solution is more apparent than real, particularly when the trays are placed in the stated order, the rotary unit does not operate as an independent unit but includes all three trays. There are other reasons too, which will be apparent from the discussions hereinbelow.

Moreover, in the prior art of the machine, the shape of the working parts of the trays causes the narrow channel between these parts to become clogged with particles of the vegetable.

Lastly, such a prior art machine cannot be used safely because there is a high degree of risk for the occurrence of injury to the fingers of the user.

The purposes of the present invention are to improve the prior art type of machine, to make it more convenient, to make its after use cleaning easier and to make it safer.

SUMMARY OF THE INVENTION

A slicing machine according to the present invention comprises generally a rotary unit mounted on a shaft and more particularly to rotary unit that comprises a first, a second and a third unit, known per se. The first unit is a diametrical elongated part in the shape of a rectangle with groups of plurality of blades symmetrically positioned with respect to the shaft and located parallel to the shaft. The second unit is a platform in the shape of a pair of quadrant portions symmetrically positioned with respect to the shaft. One of the edges of each of the quadrant shaped portions has a plurality of slots to permit the entrance of the blades therein. The third unit is a cutting tray member consisting of a pair of tray sections in the shape of quadrant shaped plates. One of the edges of the tray section is a blade member. The diametrical part and the cutting tray member remain at a constant distance from each other and are rotatably mounted on the shaft. The platform is placed between the diametrical part and the cutting tray member, and means are provided to shift the said platform in axial directions which enables the user to vary the thickness of the slices.

A feature of the present invention is that the trays are not placed in the conventional order.

A machine according to the present invention comprises a casing for the motor and the driving gear, the means for varying the thickness of the slices, a circular case positioned on the casing to contain the rotary unit, and a case cover. Preferably, a suitable electric contact is closed when the cover is on and this arrangement constitutes a safety device which prevents the starting of the motor as long as the cover is not in position. The driving gear includes a shaft perpendicular to the plane of rotation, resting its base on a ball bearing, and driven by an angular or bevelled pinion which receives the drive of the motor.

The means for adjusting the thickness of the slices comprises an elongated lever member that pivots in a plane that is inclined to the axis of the driven shaft. The lever is acted on at one end by an eccentric cam and is connected at the other end to a spindle unit, that is centered on the shaft. The lever imparts a reciprocating action to certain parts of the rotary unit movably mounted on the shaft.

The first part of the rotary unit for a machine in accordance with the present invention comprises planar members in the shape of quadrant plates serving as two trays. One of the radial edges of each of the quadrant plates is a sharpened edge. These cutting blades are symmetrical in relation to the axis of rotation and their section is either rectilinear or wavy. The planar member is secured to an axial cylinder and forms a unit that is movably mounted on the shaft. Accordingly this unit can be reciprocated along the axis of the shaft. Further the planar member is provided with a central square aperture which receives a portion of the shaft having a square cross section. This arrangement permits the transfer of the rotary motion of the shaft to the planar member. Moreover, the planar member rests on a cylindrical projection of the shaft to which it is secured by means of a nut engaging a threaded end of the shaft.

Thus, the position of the tray is fixed along the shaft.

Besides, the planar member is provided with projections at the extreme ends of the quadrant plates which projections are adapted to rest on a raised rim forming the periphery of the platforms. With this arrangement the rotary motion of the planar member can be conveyed to the platform, whatever the position of the platform along the axis may be, subject to the limits of the height of the raised rim. The rotary unit includes the platform having two symmetrically arranged trays, each shaped like a quadrant. This described structure arrangement permits the slicing of vegetables in flat slices or wavy slices at the rate of two slices for each one revolution.

In the rotary unit described above a cutting coplanar member consisting of a group of blades that are parallel to each other and perpendicular to the plane of rotation of the unit. These two groups are symmetrical in relation to the axis of the shaft. The blades are supported in an elongated diametrical member provided with a square aperture which receives a portion of the shaft having a square cross section. With this arrangement the rotary motion of the shaft can be conveyed to the diametrical part. Moreover the bottom portion of the diametrical member rests on a cylindrical projection of the shaft. These parallel blades project above the platform through slots that are provided in the radial edges. These groups of blades are fixed in the axial direction so that they can slide through the slots in the platform when the platform is moved along the axis. When the rotary unit is in motion, the parallel blades act to slit a vegetable, such as a potato into concentric cylinders which the cutting blades of the planar member will cut into incurved parallelepipeds. A machine thus equipped with this type of rotary unit member is designed to shred "pommes frites" for instance.

A cutting unit with parallel blades such as described above may have two structural arrangements. A first arrangement consists in providing a number of blades corresponding to the number of slots. In this case the space between the blades is rather small and this arrangement makes it possible to shred the vegetable into thin parallelepipeds, which is desirable in the case of making potatoes into sticks or "allumettes". A second arrangement consists in providing the cutting unit with just the number of blades necessary to fill one slot out of two. The vacant space is in this case rather important. This disposition is used for the shredding of potatoes into "pommes frites" for example.

A second type of rotary unit for a machine in accordance with the present invention comprises a platform shaped like three quadrants and a tray with a cutting radial edge, also shaped like a quadrant. As in the unit of the first type, the platform is movably mounted to an axial cylinder that is mounted on the shaft and for this reason it can be reciprocated along the shaft. The tray with the cutting edge is dependent on a second axial cylinder provided with a central square aperture which receives a portion of the shaft with a square cross section. With this arrangement, the rotary motion of the shaft can be transferred to the tray. Moreover, the bottom of the cylinder supporting the tray rests on a cylindrical projection of the shaft to which it is secured by means of a nut engaging a threaded extremity of the shaft. Thus, the position of the tray is fixed along the shaft. Besides, this tray is provided with a projection at its outermost extremity which is intended to rest on the raised rim forming the periphery of the platform. With this arrangement, the rotary motion of the tray can be conveyed to the platform whatever the position of the platform along the axis may be, subject to the limits of the height of the raised rim. The platform is provided with a diametrical line of slots perpendicular to the said line. One of the two halves of the said line is near the cutting edge of the tray. These slots are adapted to receive a sliding cutting member identical with that described above. Accordingly, a rotary unit of the second type differs from the rotary unit of the first type in that its tray has only one cutting edge. The purpose of the second type of rotary unit is to co-operate with a hopper in which the vegetable is deposited.

Such a hopper consists essentially of two concentric cylinders. The outer cylinder is secured to a cover. The inner cylinder is provided at its base with an indented ring. Two spindles which are positioned diametrically opposite to each other and which have vertical axes are mounted on the cylinder that supports the tray. The spindles are adapted, during the rotation of the rotary unit, to be connected with the notches on the ring of the inner cylinder of the hopper and to make it rotate thusly fortyfive degrees during each semi revolution. It is possible to have a rotation of ninety degrees instead of forty five by placing the spindles on the outer circumference of the tray. Moreover, the inner cylinder, by means of the cover secured to it and by means of a feeding plunger whose pressing surface is provided with spikes which penetrate the vegetable, carries the vegetable along in a rotary motion. The angular position of the spindles is such, that the rotary motion conveyed to the hopper takes place after the passage of the first group of parallel blades and of a cutting edge of the tray, and once again, just after the passage of the second group of parallel blades.

In another embodiment of the first type of rotary unit, the rectilinear blades of the tray are replaced by way blades whose cutting edges are saw-toothed, each tooth having a triangular shape, a shape known per se. According to the present invention, the two teeth on the tray are radially shifted with reference to each other (with this arrangement the second blade does not follow the groove of the first blade). This arrangement eliminates the use of a diametrical elongated member and with a non-rotary hopper to cut vegetables may be cut into threads such as celery stalks for celery salad and "pomme paille". The thinness of the threads can be adjusted by means of an adjusting device. Another arrangement would be to have no diametrical member, but a rotary hopper which would be driven by the spindles of the cutting tray. This structure would permit the cutting "pommes gaufrettes" and whose apertures could be adjusted by means of the same adjusting device.

The second type of rotary unit cooperating with a rotary hopper is adapted to cut the vegetable into small pieces, two opposite sides of which have flat parallel surfaces, the other four sides having cylindrical surfaces (small vegetable pieces of this kind are commonly called "julienne"). Indeed, the group of vertical blades that are non-contiguous to the cutting edge will cut through the vegetable and produce a first set of concentric cylinders. Then a spindle engages a notch at the base of the inner cylinder of the hopper and thus connects to the cylinder. Therefore, with respect to a curved body potato, a rotation of 45° (or 90°), is provided. Then the notch is released, and after that, the second group of parallel blades cut through the vegetable and produce another set of cylinders, concentric with each other but not concentric with the cylinders of the first set. Lastly the cutting edge cuts into smaller pieces the portions of the vegetable delimited by the cylinders of the sets mentioned above.

Further a machine according to the present invention is advantageously provided with brushes. A brush is mounted along a radius on each of the quadrant plates of the cutting tray member. This radius is, with reference to the direction of rotation, behind the radius forms the cutting blade of the tray member.

BRIEF DESCRIPTION OF THE DRAWINGS

FIG. 3 shows a perspective exploded view of the essential feature of the machine including a first embodiment of a rotary unit;

FIG. 4 shows a cross sectional view of the top portion of the machine including a spring pressed push button for a rotary hopper;

FIG. 5 shows a bottom view of a cover and a rotary hopper;

FIG. 6 shows a partial sectional view of FIG. 5;

FIG. 7 shows a cross sectional view of a second embodiment of a rotary unit; and FIG. 8 is a top plan view of FIG. 7.

DESCRIPTION OF THE PREFERRED EMBODIMENTS

Figure 1:
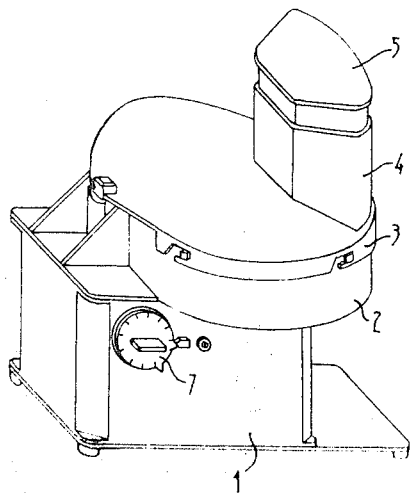
FIG. 1 shows a perspective view of a vegetable slicing machine constructed in accordance with the principles of the present invention.

The perspective view of FIG. 1 shows a vegetable slicing machine. Describing broadly the components of the machine from bottom to top, there is a casing 1 for housing a motor and a transmission gear, a circular case 2 positioned on the top of the casing 1 and adapted to contain a rotary unit, a case cover 3, a hopper 4 mounted above the case cover 3 and adapted to slice a vegetable product, i.e. cutting potatoes into "frites", a plunger 5 for forcing the vegetable against a cutting member, and an adjusting knob 7 that is calibrated in order to select the desired thickness of the sliced product.

Figure 2:
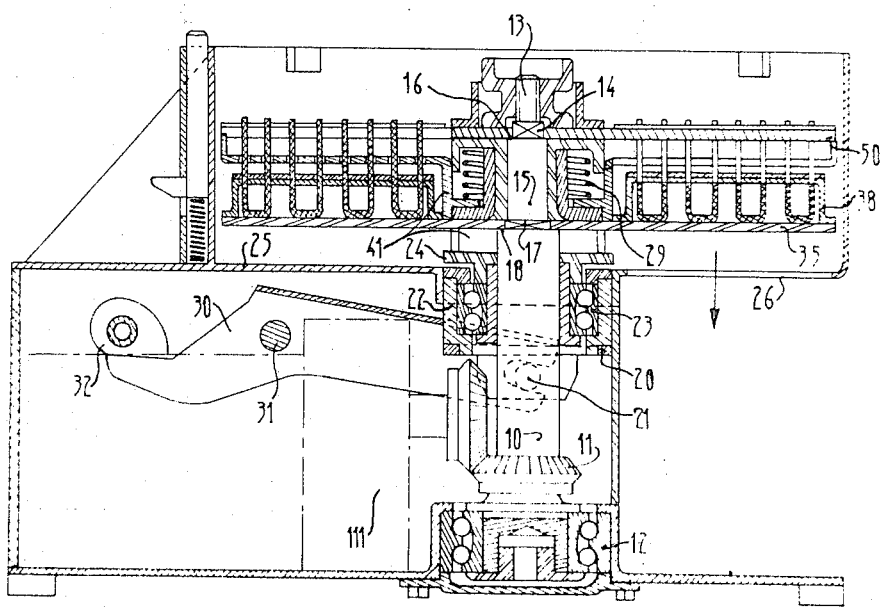
FIG. 2 shows a cross sectional view taken on line AA of FIG. 3.

Describing more specifically the components of the machine FIG. 2 shows a vertically positioned shaft 10 whose rotation is effected by a motor unit 111 by means of cone-shaped or bevelled type driven pinions 11. The base of the shaft 10 is rotatably mounted on the frame of the casing 1 by means of a ball-bearing 12. The shaft 10 has a threaded projection 13 on the upper extremity thereof. Further, the shaft 10 in consecutive order beneath the top projection 13 includes a first shaft portion 14 having a square cross section 14, a cylindrical part 15 and a second shaft portion 17 having a square cross section. Between the shaft portion 14 and the cylindrical shaft portion 15, there is a shoulder 16 and between the square shaft portion 17 and the main part of the shaft 10, there is another shoulder 18. A ring 20 is mounted in a spaced concentrical relationship with respect to the main part of the shaft 10. The ring 20 is provided with a pair of radial spindles 21 on the outer ends thereof. Above the ring 20, a cylindrical cage 22 is movably mounted on the shaft 10 and encloses a ball-bearing 23 whose inner ring contains a concentrically arranged circular tray 24. An axial cylindrical member 41 that is movably mounted on shaft 10 is supported on the tray 24. An elongated member or lever 30 is mounted within the casing 1, constructed to pivot around an axle 31 that is supported within the casing 1. The pivotal mounted lever 30 is operatively connected to an eccentric cam 32 which is controlled from the outside of the casing 1 by the knob 7. The rotation of the lever 30 thus produces a reciprocating movement to the cylindrical cage 22 which operation will be described in detail hereinbelow.

The bottom 25 of the circular case 2 is provided with a chute opening 26 through which the cut pieces of vegetable fall.

As illustrated in FIG. 3 a forked extremity or extended flange portion 33 of the lever 30 engages each of the spindles 21 of the ring 20. A rotary unit which will be described in detail hereinbelow comprises essentially three elements, namely, a lower elongated member 35 having upstanding blade members 37, an intermediate platform 40 including two quadrant portions having peripheral rims and radial positioned notches to receive the upstanding blade members 37, and an upper tray member 50 having radial positioned cutting edges 53 and radial positioned brushes 58. These three elements are arranged approximately symmetrical with reference to the axis of the shaft 10 on which they are rotatably mounted.

The lowermost element, the diametrical elongated member 35 is provided with a central square aperture 36 for mounting on the second square cross section shaft portion 17. The elongated member 35 is provided with two groups of blades 37. Each group is perpendicular to the plane of rotation of the rotary unit. A strengthening part 38 helps to maintain a constant space between the blade members 37. The cutting edges of the blade member 37 is shown as portion 138 in FIG. 3.

The intermediate element, the platform 40, comprises a pair of substantially quadrant-shaped coplanar portions that are symmetrically arranged about the shaft 10 and that are secured to the axial cylinder 41. The cylinder 41 is at its base provided with two notches 42 having a width fitting the central flat portion of the elongated member 35. When the rotary unit is assembled, the lower edges of the cylinder 41 rest on the circular tray 24, which in turn rests on the cylindrical cage 22, the position of which is determined by the lever 30 (through the spindles 21). Then, the rotation of said lever 30 will move up and down the middle element 41-40, without moving the diametrical part 35, the central square aperture of which 36 fitting and being fastened to the square section 17, whereby the rotation of the shaft 10 drives said diametrical part 35, which in turn drives in rotation the platforms 40 through the notches 42. The platforms 40 have two radial edges 44 provided with slots 45. The slots 45 are adapted for the sliding of the blades 37 when the platforms 40 are moving up and down relatively to the diametrical part 35. These platforms have two peripheral raised rims 46.

The third, the upper element of the rotary unit comprises two quadrant shaped trays 50 secured to an axial part 151 approximately cylindrical; this axial part is provided with a central square aperture 51, fitting the square cross section 14 of shaft 10. Thus, when the rotary unit is assembled, the upper element is driven in rotation by the shaft 10. Two radial edges diametrically opposite to each other are cutting blades 53, (these blades can be either rectilinear as shown in FIG. 3, or wavy for the cutting of potatoes into wafer-shaped slices or for the cutting into threads); the peripheral edges 54 of these trays are provided with two projections 55 for reinforcing the trays.

A cylindrical ring 57 is secured to the axial part 151 of the tray. The ring 57 is provided with two spindles or pins such as 59 and is adapted to effect the rotation of a rotary hopper when the rotary unit including the cutting blade has to co-operate with this hopper, as described below.

The working of the mechanism for adjusting the thickness of the slices

Some parts can only be translated, or can only pivot, in a plane including the axis of the shaft 10. These parts are: the lever 30, the ring 20 topped by its cylindrical cage 22 and the outer ring of the ball bearing 23. Some parts can only rotate around the axis of the shaft 10. These parts are: the ring 57, the trays 50 and, when it is included in the rotary unit, the cutting member with parallel blades 37 which are perpendicular to the plane of rotation of the trays 50 and are sustained by the diametrical part 35; lastly, some parts are adapted to rotate around the axis of the shaft 10 and can be translated along this axis too. These parts are: the inner ring of the bell bearing 23, the tray 24 and the platforms 40 sustaining the said tray be means of the axial cylinder 41. So, the platforms 40 can, under the action of the tray 24, of the inner ring of the ball bearing 23, of the outer ring of the ball bearing 23, of the cage 22, of the ring 20, of the spindles 21, of the lever 30 and finally of the cam 32, and against the action of the spring 29 apparent in FIG. 2, while driven in rotation by the projections of the trays 53, be translated up and down within the space bounded by the trays 50 and the strengthening part 38; after a slice of vegetable has been cut by the cutting edge 53 of a tray 50, the tray 50 releases the vegetable which is brought into contact with and slides on a platform 40, through pressure of the hand exerted on the plunger 5 in FIG. 1; the rotary unit continuing to rotate, another cutting edge 53 begins to cut the vegetable; so, it can be understood that the thickness of the slice of vegetable depends on the space between the plane of rotation of the trays and the plane of rotation of the platforms. This mechanism is applicable to many of the conventional types of rotary units.

In FIG. 3 we can also notice that brushes 58, rubber brushes for instance, are mounted on the edges of the trays 50 which are not sharpened. They sweep the bottom 25 of the case 2 (FIG. 2), and drive to the chute 26 the particles of vegetable which have not fallen right into this chute.

In FIGS. 5 and 6 a cover for the case 60 is provided with a rotary hopper consisting of an inner cylinder 63 and an outer cylinder 64; the inner cylinder 63 can rotate in the outer cylinder 64 and its base is provided with an indented ring 65, whose eight (or four) notches are at an angular distance of 45 (or 90°) from each other. It is on these notches that the projections 59 of the ring 57 (FIG. 3) act to make the hopper rotate.

The inner cylinder can receive a pusher-cover 67 as shown in FIG. 4. This pusher-cover is provided with a manual pusher 68 consisting of a rod with a square cross section 69 (driven in rotary motion by the inner cylinder 63), provided on one end with a pusher-button 70, free in rotation, and on the other end with a small plate 71 to which spikes 72 are fastened. This small plate 71 is doubled by another small plate 75 that is provided with holes for the passage of the spikes 72; the plate 75 is pushed downwards by means of a spring 79. An appropriate device, which is not shown in the drawings, prevents the small plate from coming out of place.

When a potato is put in the rotary hopper 61 which is covered with a pusher-cover 67, the operator presses the pusher-button 70 and the small plate 75 comes into contact with the small plate 71, the spikes penetrate the potato; they drive it in rotary motion whenever a projection 59 acts on a notch 66 of the rotary hopper. The downward movement of the pusher is restricted so that the spikes cannot reach the level of the trays 50; when the last slice has been cut, the spring 79 releases and what remains on the pusher is ejected on the platform.

In FIG. 7 and 8, a rotary unit of a second type comprises a board 76 shaped like three quadrants and a tray 77 with cutting edges 74. The board 76 is provided with a line of diametrical slots such as 78, perpendicular to the said line; these slots are adapted for the sliding of a cutting member with parallel blades such as the one sustained by the diametrical part 35 in FIG. 3; this cutting member has not been represented in FIGS. 7 and 8.

When a rotary unit cooperates with a rotary hopper, with each turn of the unit, the passage of the first group of parallel blades cuts concentric lines in the vegetable. After the hopper rotates a little and then stops, the passage of the second group of parallel blades cuts other concentric lines crossing the first ones, and the cutting edge of the rectilinear blade 74 cuts off pieces of vegetable shaped like parallelepipeds. This constitutes "julienne" cutting.

It is to be noted that the cover of FIG. 1, i.e. the cover sustaining a prismatic hopper, can be combined with the cover in FIG. 6 sustaining a rotary hopper, to form a single cover that is provided with a prismatic hopper and with a rotary hopper, diametrically opposite to each other. In this case, fixing devices permit the cover in two positions at an angular distance of 180° from each other, to perform, with the appropriate unit, of course, either the cutting into "pommes frites", flat slices, wavy slices, or the cutting into "wafers" or the "julienne" cutting.

In another embodiment, adapted to improve the cleaning conditions, the cover is bell-shaped and it acts as a case.

FIG. 6 shows also a starting indicator 160 set in motion by a cam 73 of the rotary unit in FIG. 7. The operator must use the device for dicing vegetable only when the indicator is on. In the absence of this precaution, the first rotation of the rotary unit will cut off sticks instead of cubes.

What we claim is:

1. A machine for cutting slices of various desired thicknesses and shapes from vegetables comprising in combination:

a housing;

a driven shaft vertically positioned within said housing;

a pivot means concentrically and rotatably mounted near the base of said shaft;

a cylindrical cage having ball bearing means therein and concentrically and rotatably mounted above said pivot means on said shaft;

a circular tray mounted above said cylindrical cage and in a concentric, reciprocative and rotatable manner with respect to said shaft; an elongated member rotatably mounted at its medial point above said circular tray on said shaft, said member having groups of upstanding blades symmetrically located with respect to said medial point;

a platform mounted in a concentric, reciprocative and rotatable manner with respect to said shaft and including substantially quadrant shaped coplanar portions symmetrically arranged about said shaft, said platform having a series of notches along the edge of each of said quadrant portions, said notches corresponding to and operatively receiving said upstanding blades for passage therethrough;

a concentrically arranged tray member mounted above said platform and in a concentric and rotatable manner with respect to said shaft, said tray member including substantially quadrant shaped coplanar plates symmetrically arranged about said shaft, one radial edge of each of said plates forming a cutting blade;

means including a lever for axially reciprocating said platform between said elongated member and said tray member, said lever being eccentrically mounted with respect to said shaft and operatively connected in a pivotal manner to said pivot means; and means associated with said tray member for depositing therein the vegetables to be sliced.

2. A machine according to claim 1, wherein said axially reciprocating means includes spring means mounted on the top end of said shaft to bias said platform toward said elongated element.

3. A machine according to claim 1, and includes downwardly projected brush members mounted on the other radial edges of said tray member for brushing vegetable particles therefrom.

* * * * *